United States Patent [19]

Saito et al.

[11] Patent Number: 4,669,146
[45] Date of Patent: Jun. 2, 1987

[54] CASTER

[75] Inventors: Shintaro Saito; Genji Ohkuma, both of Oume, Japan

[73] Assignee: Nissan Motor Company, Limited, Japan

[21] Appl. No.: 792,598

[22] Filed: Oct. 29, 1985

[30] Foreign Application Priority Data

Dec. 30, 1984 [JP] Japan ................ 59-200788[U]

[51] Int. Cl.[4] .......................................... B60B 33/00
[52] U.S. Cl. ...................................... 16/18 A; 16/23; 16/48
[58] Field of Search ............... 16/47, 48, 18 A, 18 R, 16/22, 23, 46

[56] References Cited

U.S. PATENT DOCUMENTS 3,015,838  1/1962  Ulinski .................................. 16/48
4,471,508  9/1984  Seaborg ............................. 16/18 R

FOREIGN PATENT DOCUMENTS

| 55-13123 | 1/1980 | Japan . |
| 55-117302 | 8/1980 | Japan . |
| 55201 | 4/1982 | Japan .................... 16/45 |
| 127090 | 5/1919 | United Kingdom . |
| 427728 | 4/1935 | United Kingdom . |
| 603936 | 6/1948 | United Kingdom . |
| 1220563 | 1/1971 | United Kingdom . |

*Primary Examiner*—Leonidas Vlachos
*Attorney, Agent, or Firm*—Leydig, Voit & Mayer

[57] ABSTRACT

A caster includes a mechanism that allows a wheel axle to shift rearward through a distance corresponding to the previous lag of the axis of rotation of the wheel behind the wheel bearing axis when the caster reverses its direction of advance. In a first embodiment, the mechanism includes a unit rotating a wheel axle to reverse the trail. In a second embodiment, the mechanism includes a slider allowing the wheel axle to slide horizontally.

3 Claims, 6 Drawing Figures

CASTER

BACKGROUND OF THE INVENTION

1. Field of the Invention

This invention relates to a caster and particularly to a caster mounted on the underside of a vehicle, e.g. a forklift.

2. Description of the Prior Art

Common prior art casters mounted on vehicles swing through 180° when the vehicle body reverses its direction of advance.

For example, Japanese published unexamined utility model application No. 55-13123 discloses a caster as shown in FIG. 6. This caster comprises an annular ball bearing race plate 100 fixed to the underside of the vehicle body, a journal plate 101 coupling with the fixed race plate 100 via a plurality of balls to form a ball bearing 102, and a wheel 103 having an axle 104 journalled within the lower end of the journal plate 101. The ball bearing 102 does not allow the journal plate 101 to move radially with respect to the fixed race plate 100. The point of contact of the tread 105 of the wheel 103 with the ground is offset by a distance $t_o$ from the axis of rotation 106 of the ball bearing 102. Thus, as the caster-mounted vehicle moves, the distance $t_o$ causes the wheel 103 to trail. In particular, when the caster-mounted vehicle reverses its direction of advance, the wheel 103 swings through 180° on its tread 105 due to the load on the wheel 103 transmitted between the tread 105 and the ground. This swinging motion of the wheel 103 causes a jerk, i.e. a force causing irregular movement of the caster-mounted vehicle.

However, Japanese published unexamined utility model application No. 55-117302 discloses a caster in which the axis of rotation of the wheel can shift horizontally relative to the axis of the ball bearing when the caster-mounted vehicle reverses its direction of advance. This caster comprises a wheel, rectangular inner frameworks retaining the opposite ends of the axle of the wheel, a plurality of rollers mounted on the upper and lower edges of the inner frameworks, rectangular outer frameworks, along the inner surfaces of which the rollers rolls, arms supporting the outer frameworks, and a turning ring mounting the arms onto the vehicle body. This caster has a large number of parts and is not compact.

SUMMARY OF THE INVENTION

An object of this invention is to provide a caster which can reverse the trail between the axes of rotation of the caster itself and of a caster wheel without rotating the wheel about its tread (point of contact) when a caster-mounted vehicle reverses its direction of advance. In order to achieve this object, this invention includes a rolling bearing mounted on a framework fixed to a moving object, a wheel bearing mounted onto and rotatable relative to the framework by means of the rolling bearing, a wheel journalled at a point of the wheel bearing offset by a given distance (trail) from the axis of rotation of the wheel bearing, and a mechanism which allows the axis of rotation of the wheel to shift rearward past the axis of rotation of the wheel bearing each time the direction of advance of the caster is reversed. When the caster reverses its direction of advance, the shifting mechanism exerts a first resistance to rotation of the wheel bearing, the first resistance being smaller than a second resistance to rearward movement of the axis of rotation of the wheel of the caster so as to allow the axis of rotation of the wheel to shift rearward to a point corresponding to the trail of the wheel in the previous direction of advance of the caster. On the other hand, when the caster alters its direction of advance through less than 180°, the first resistance is greater than the second resistance so that the wheel bearing can pivot to follow the change in direction of advance of the caster.

According to this invention, reversing the direction of advance of a caster-mounted moving object will not subject the moving object to unbalancing forces.

DESCRIPTION OF THE PREFERRED EMBODIMENTS

The preferred embodiments of this invention will be described below with reference to FIGS. 1 to 5.

FIRST EMBODIMENT

Figure 1:
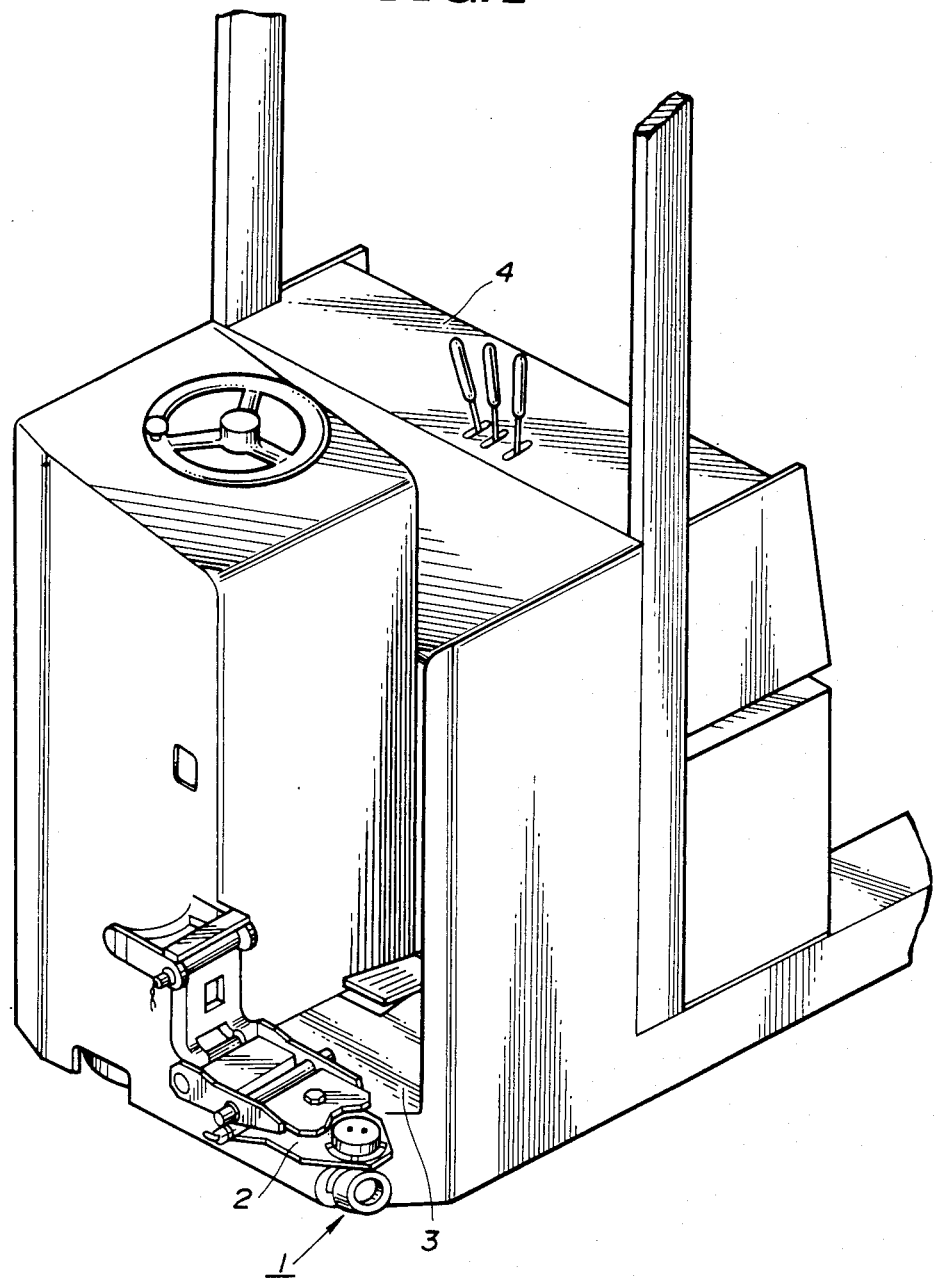
FIG. 1 is a perspective view of a cab of a reach-type forklift mounting a caster according to a first embodiment of this invention.

As shown in FIG. 1, a caster 1 is mounted on the underside 2 of a driver's cab 3 of, e.g. a reach-type forklift 4.

Figure 2:
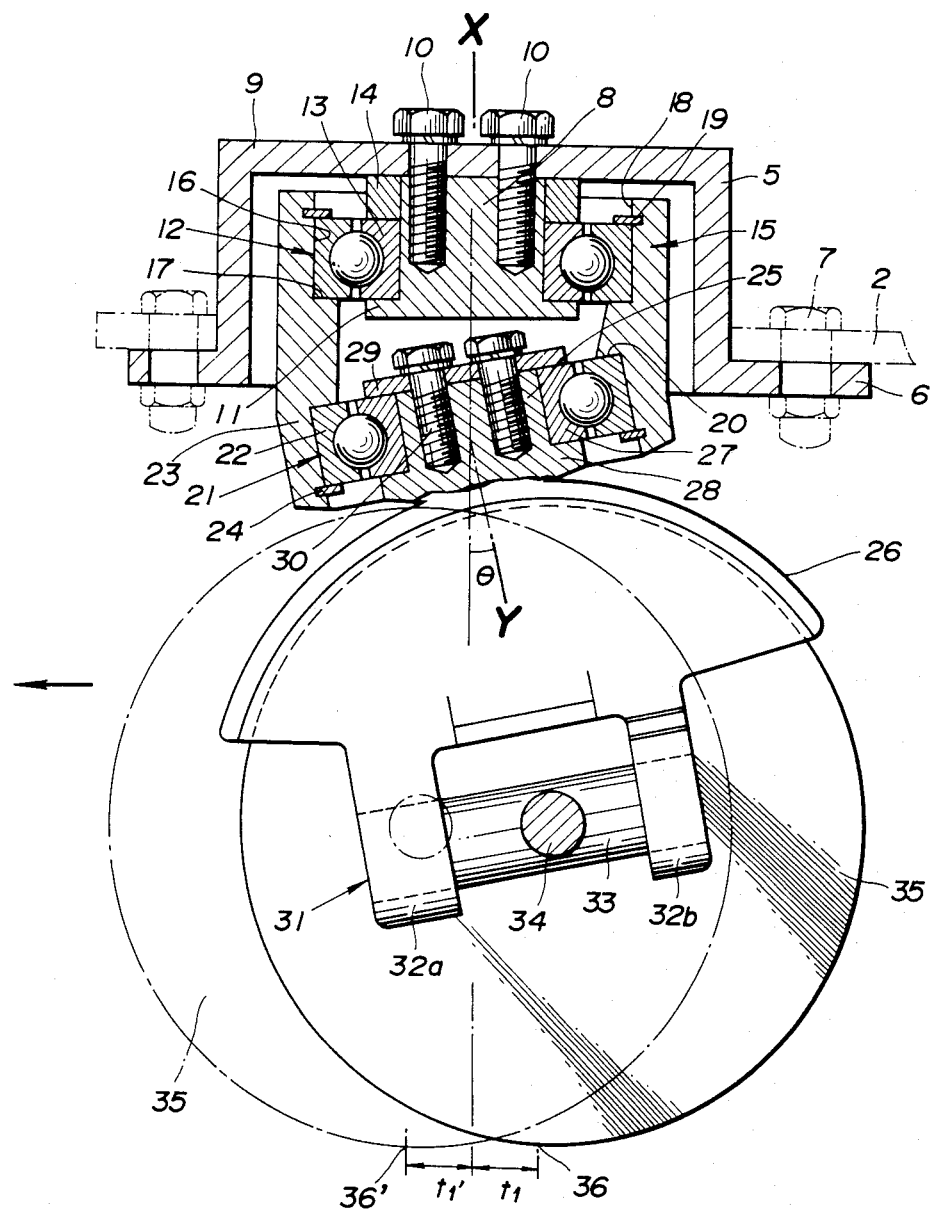
FIG. 2 is a longitudinal section through the caster of FIG. 1.
Figure 3:
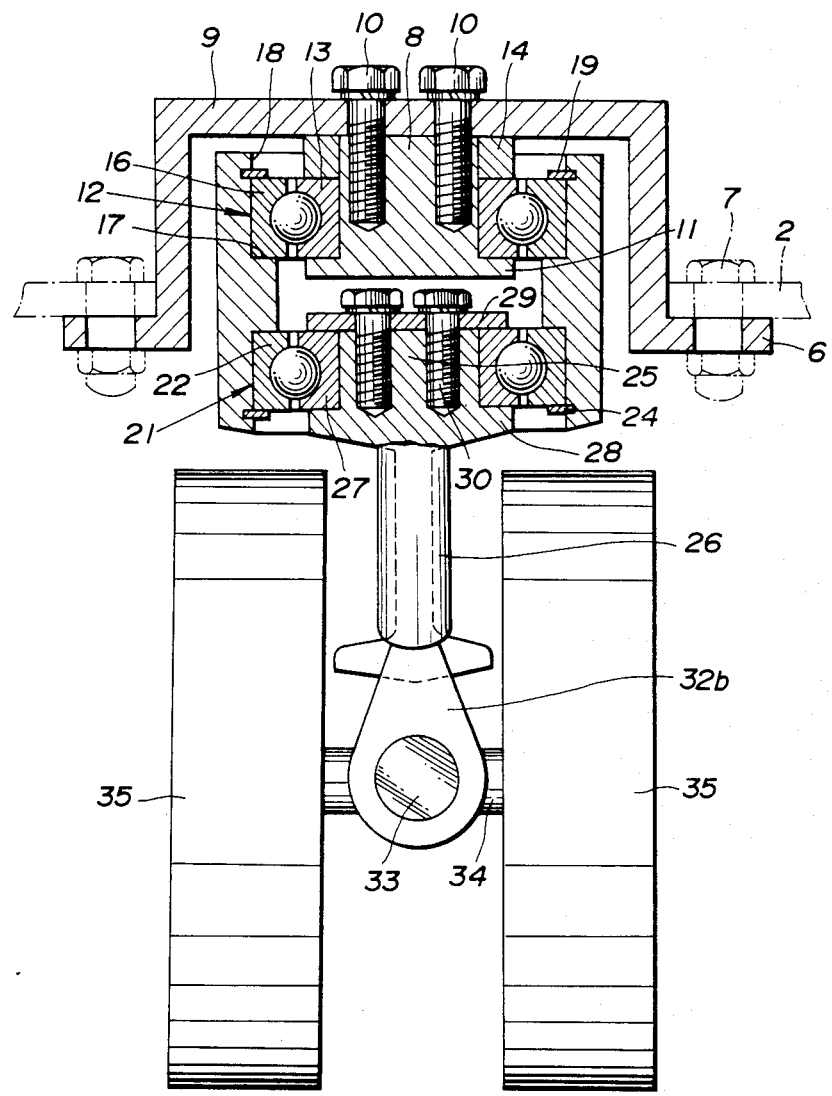
FIG. 3 is a cross-section through the caster of FIG. 1.

As shown in FIG. 2, a cup-shaped framework 5 has an annular flange 6 at its lower end. The flange 6 is fixed to the underside 2 nuts and bolts 7. The body of the framework 5 projects upwards through the underside 2. A short stationary axle 8 is fixed to the center of the inner surface of the ceiling 9 of the framework 5 by bolts 10. The lower end of the fixed axle 8 terminates at a flange 11.

A first ball bearing 12 is seated on the flange 11 with its inner race 13 fitted onto the cylindrical surface of the fixed axle 8. A collar 14 is fitted onto the cylindrical surface of the fixed axle 8 with its lower edge in contact with the upper edge of the inner race 13. The flange 11 and the collar 14 sandwich the inner race 13 to hold the inner race 13 in place on the fixed axle 8.

A hollow, essentially cylindrical rotator 15 serving as part of a wheel bearing is mounted on the outer surface of the outer race 16 of the first ball bearing 12. An upward shoulder 17 formed in the top part of the inner wall 18 of the rotator 15 lies horizontally in the plane of the upper surface of the flange 11. A snap ring 19 fits into a groove in the inner wall 18 with its underside in contact with the upper edge of the outer race 16. The upward shoulder 17 and the snap ring 19 sandwich the outer race 16 and fix it in place on the rotator 15.

An oblique, downward shoulder 20 is formed in an oblique lower part 23 of the inner wall 18 of the rotator 15. The forward edge of the downward shoulder 20 (i.e. the left edge as viewed in FIG. 2) is lower than the rearward edge of the downward shoulder 20 (i.e. the right edge as viewed in FIG. 2) in any direction of advance of the forklift 4.

A second ball bearing 21 of the same type as the first ball bearing 12 is seated on the downward shoulder 20 with its outer race 22 fitted into the oblique lower part 23 of the inner wall. A snap ring 24 fits into a groove in the oblique inner wall 23 with its upper surface in contact with the lower edge of the outer race 22. The oblique downward shoulder 20 and the snap ring 24 sandwich the outer race 22 and fix it to the rotator 15.

A rotatable axle 25 integral with the top of a wheel bearing body 26 is fitted within the inner race 27 of the second ball bearing 21. The upper edge of the rotatable axle 25 lies flush with the upper edges of both the inner and outer races 27 and 22. The lower end of the rotatable axle 25 terminates at an annular flange 28. The upper surface of the flange 28 is in contact with the lower edge of the inner race 27. A fixing disc 29 held contact with the upper edges of both the rotatable axle 25 and the inner race 27 by means of bolts 30 fixes the wheel bearing body 26 to the inner race 27.

The lower end of the wheel bearing body 26 terminates at a yoke 31 comprising a set of forward and backward branches 32a and 32b. A steering shaft 33 is fixed to and between the branches 32a and 32b. An axle 34 common to two wheels 35 passes through and perpendicular to the center of the steering shaft 33 and is fixed to the steering shaft 33. The wheels 35 turn about the axle 34 via bearings (not shown).

The axis Y of the rotatable axle 25 passes through the center of the axle 34 and is oblique through an angle $\theta$ to the axis X of the fixed axle 8. The tread 36 of each wheel 35 lies directly beneath the corresponding end of the axle 34. The distance $t_1$ between the axis X and the point directly beneath the center of the axle 34 is the trail $t_1$ of each wheel 35.

The obliqueness of the wheel bearing is so selected to yield a predetermined resistance to rotation of the rotatable axle 25 within the rotator 15 as the wheels 35 rotate about their treads 36. When the forklift 4 alters its direction of advance by less than 180°, this resistance is greater than the counter-force exerted by the wheels 35 turning about their treads 36, so that the rotator 15 and the wheel bearing body 36 rotate in combination. On the other hand, when the forklift 4 reverses its direction of advance (i.e. toward the right as viewed in FIG. 2), this resistance is smaller than the counter-force exerted by the wheels 35 which tend to turn about the treads 36, so that the rotator 15 rotates solely through 180° and thus reverses the tilt of the wheel bearing body 26 as viewed in phantom lines of FIG. 2. New treads 36' of the wheels 35 yield a reversed trail $t_1'(=t_1)$ opposite the X-axis from the old trail $t_1$ as shown in FIG. 2.

In this embodiment, reversal of the forklift 4 will not cause the 180° rotation of the wheels 35 about the treads 36 or 36' and thus can stabilize the reverse movement of the forklift 4.

SECOND EMBODIMENT

Figure 4:
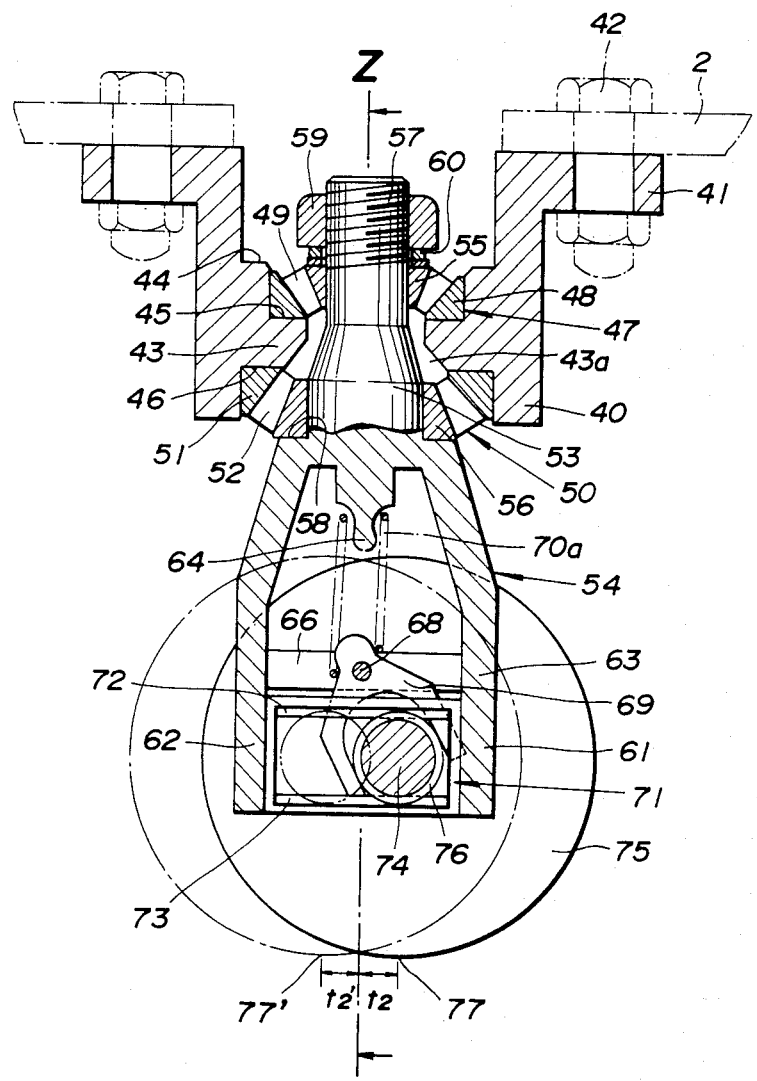
FIG. 4 is a longitudinal section through a caster according to a second embodiment of this invention.
Figure 5:
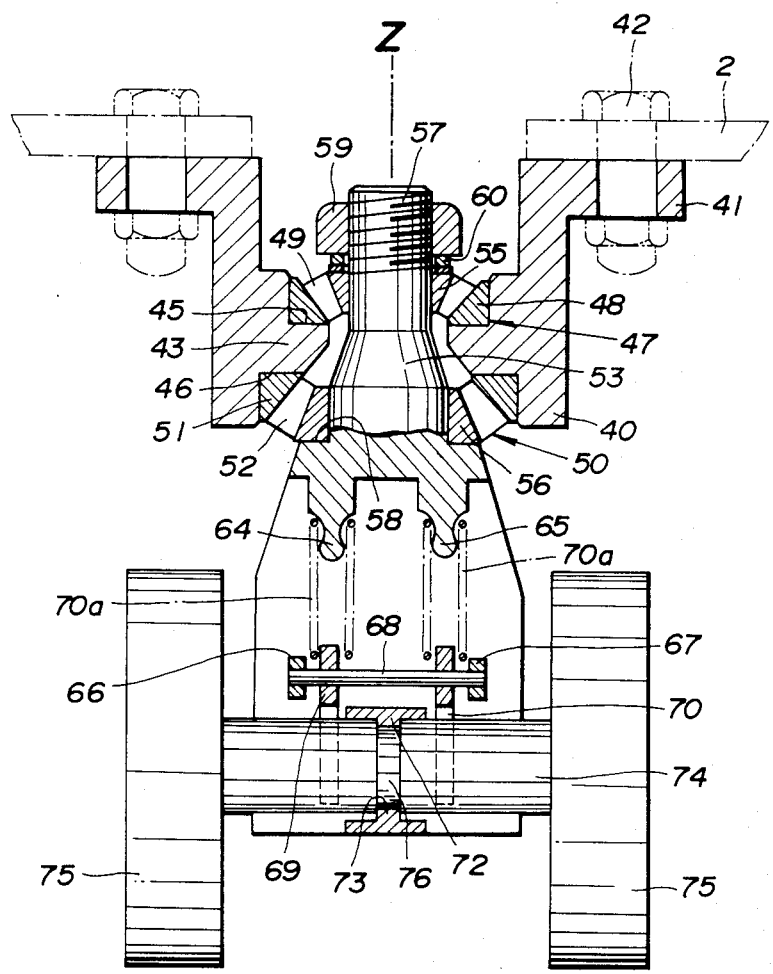
FIG. 5 is a cross-section through the caster of FIG. 4.
Figure 6:
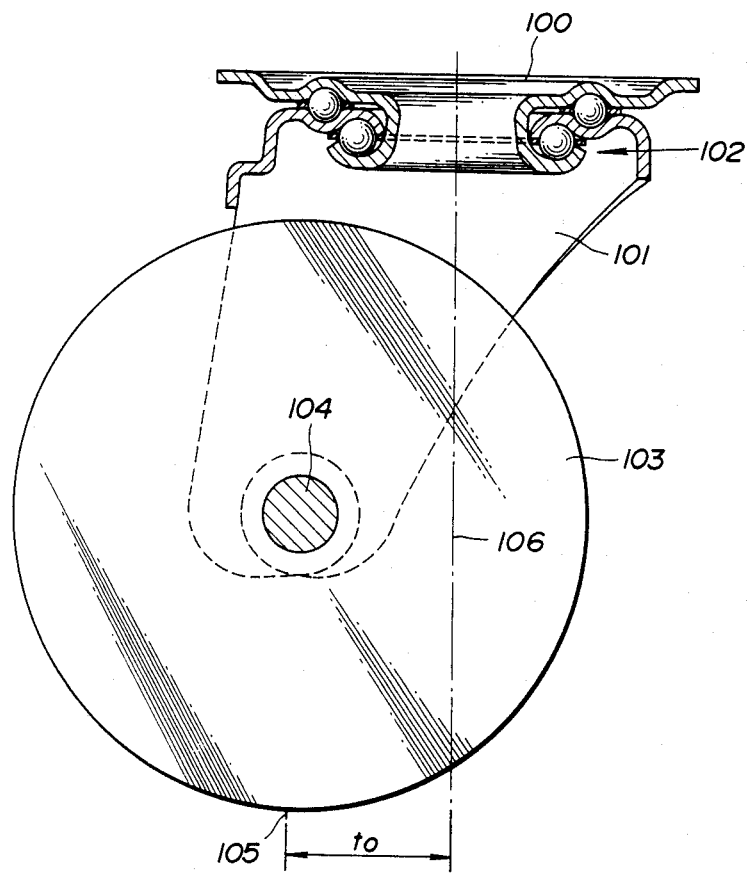
FIG. 6 is a longitudinal section through a prior art caster.

FIGS. 4 and 5 illustrate a second embodiment. An essentially cylindrical framework 40 has an annular flange 41 at its upper end. The flange 41 is fixed to the underside 2 of the driver's cab 3 of the forklift 4 by nuts and bolts 42. The body of the framework 40 projects downwards from the underside 2. The inner wall of the framework 40 has an inward flange 43 in its lower part. The flange 43 has first and second upward shoulders 44 and 45 and a downward shoulder 46. The inner diameter of the downward shoulder 46 is larger than the inner diameter of the first upward shoulder 44 but is smaller than the outer diameter of the second upward shoulder 45. The outer diameter of the downward shoulder 46 is larger than the outer diameter of the second upward shoulder 45. A hole 43a passing between the inner edges of the second upward shoulder 45 and the downward shoulder 46 is essentially conical and its diameter increases towards its lower end.

A first roller bearing 47 is seated on the second shoulder 45 with its outer race 48 fixed to the flange 43. The rollers 49 of the first roller bearing 47 are essentially conical. The diameter of each roller 49 decreases towards its lower end. A second roller bearing 50 is similar to but larger than the first roller bearing 47 and is seated on the downward shoulder 46 with its outer race 51 fixed to the flange 43. The roller bearings 47 and 50 are arranged coaxially. The diameter of each roller 52 of the second shoulder 45 increases towards its lower end.

An axle 53 at the top of a wheel carriage 54 is fitted within the inner races 55 and 56 of both the first and second roller bearings 47 and 50. The upper end 57 of the axle is threaded. The lower end of the axle 53 terminates at an upward shoulder 58. The surface of the upward shoulder 58 is in contact with the lower edge of the inner race 56 of the second roller bearing 50. A nut 59 is threaded onto the upper end 57 via washers 60 and thus fixes the axle 53 within the first roller bearing 47.

The lower part of the wheel carriage 54 terminates at a yoke 61 comprising a forward branch plate 62 and a rearward branch plate 63. The crotch of the yoke 61 has a pair of spring seats 64 and 65, both projecting downwards. A pair of parallel support plates 66 and 67 are fixed to and between the forward and backward branch plates 62 and 63 below the spring seats 64 and 65. A pivot shaft 68 is fixed to and between the support plates 66 and 67. A pair of yokes 69 and 70 are mounted on the pivot shaft 68. A spring 70a is seated between each spring seat 64 or 65 and the top of each yoke 69 or 70. A rectangular guide frame 71 is fixed to and between the forward and rearward branch plates 62 and 63 between the yokes 69 and 70. The inner surface of the upper part of the guide frame 71 has an upper rail 72. The inner surface of the lower part of the guide frame 71 has a lower rail 73 parallel to the upper rail 72. An axle 74 common to wheels 75 extends through the yokes 69 and 70 and the guide frame 71. The center of the axle 74 has an annular groove 76 engaging both the upper and lower rails 72 and 73.

As the forklift 4 continuously advances to the left as viewed in FIG. 4, the axle 74 shifts to the rear-most point within the guide frame 71 as shown in solid lines in FIG. 4 and the treads 77 directly beneath the axle 74 lag behind the axis Z of the wheel carriage 54 by the trail $t_2$. When the forklift 4 alters its direction of advance within 180°, the axle 74 remains at the rear-most point within the guide frame 71, but the wheel carriage 54 and the wheels 75 rotate about the treads 77. On the other hand, when the forklift 4 reverses its direction of advance (i.e. to the right in FIG. 4), the axle 74 rolls horizontally along the upper and lower rails 72 and 73 rearwards (i.e. toward the left in FIG. 4) to the position shown in phantom lines in FIG. 4 and the new treads 77' trail the axis Z by $t_2'(=t_2)$ since the rotary friction between the axle 74 and the rails 72 and 73 is generally smaller than the rotary friction between the treads 77 and the ground.

In this embodiment too, reversal movement of the forklift 4 will not cause 180° rotation of the wheels 75 about the treads 77 or 77'.

What is claimed is:

1. A caster for a moving object, comprising:
   a framework fixed to the moving object;
   a rolling bearing mounted on said framework;
   a wheel carriage mounted on and rotatable relative to said framework by means of said rolling bearing;
   a wheel journalled at a point of said wheel carriage offset by a given trail distance from a vertical axis of rotation of said wheel carriage, a tread of the wheel lying directly beneath the point; and
   means for shifting the axis of rotation of said wheel relative to the vertical axis of rotation of said wheel carriage, when the direction of advance of the caster is reversed, to a point at which said wheel trails the wheel carriage vertical axis by said trail distance in the new direction of advance; and
   wherein said wheel carriage has a second axis of rotation oblique to the vertical axis of rotation of said wheel carriage and extending through the axis of rotation of said wheel; and
   wherein said wheel is mounted on an axle journalled on said wheel carriage; and
   wherein said shifting means reversed the obliqueness of the second axis of rotation of said wheel carriage relative to the vertical axis of rotation of said wheel carriage in the direction of advance about the wheel carriage when the direction of advance of the caster is reversed.

2. A caster as recited in claim 1, wherein said rolling bearing comprises a stationary element fixed to the framework and a ball bearing, the inner race of which is mounted on said stationary element, and wherein said wheel carriage comprises a rotator fixed to an outer race of said ball bearing of said rolling bearing and having a canted section oblique to the axis of said ball bearing, a second ball bearing, the outer race of which is mounted in the canted section of said rotator, and a wheel axle support shaft fixed to an inner race of said second ball bearing at one end and rotatably supporting said wheel axle.

3. A caster as recited in claim 1, wherein said shifting means swings said wheel carriage and said wheel in such a manner that the second axis of rotation of said wheel carriage moves in a skewed path relative to the vertical axis of rotation of said wheel carriage, the path forming a cone above and below the point of intersection of the two axes of rotation of said wheel carriage.

* * * * *